Jan. 21, 1930.   J. C. WALTERS   1,744,289
LIQUID LEVEL INDICATING SWITCH APPARATUS
Filed Sept. 22, 1925

John C. Walters,
Inventor

Patented Jan. 21, 1930

1,744,289

UNITED STATES PATENT OFFICE

JOHN C. WALTERS, OF RURAL RETREAT, VIRGINIA

LIQUID-LEVEL-INDICATING SWITCH APPARATUS

Application filed September 22, 1925. Serial No. 57,967.

This invention relates to an improved liquid level indicating apparatus especially intended for use for indicating the oil level in the crank case of internal combustion engines and the like.

An important object of the invention is to provide an apparatus of the above character which may be readily mounted in association with the crank case of an internal combustion engine so as to operate a signal when the oil level in the crank case has diminished beyond a predetermined point.

Another object of the invention is the provision of an apparatus of this character whereby the ignition system of the engine will be automatically disconnected when the oil level has reached a dangerous low point.

A still further object of the invention is the provision of an apparatus of the above mentioned character adaptable for indicating the level of liquids of various types so as to indicate the diminishing content of the container.

A still further object of the invention is the provision of an apparatus of the above character especially intended for use in connection with the crank case of internal combustion engines designed to operate efficiently although comparatively simple in construction so as to be manufactured at a comparatively low cost.

Other objects and advantages of this invention will become apparent as the description progresses.

Figure 1:
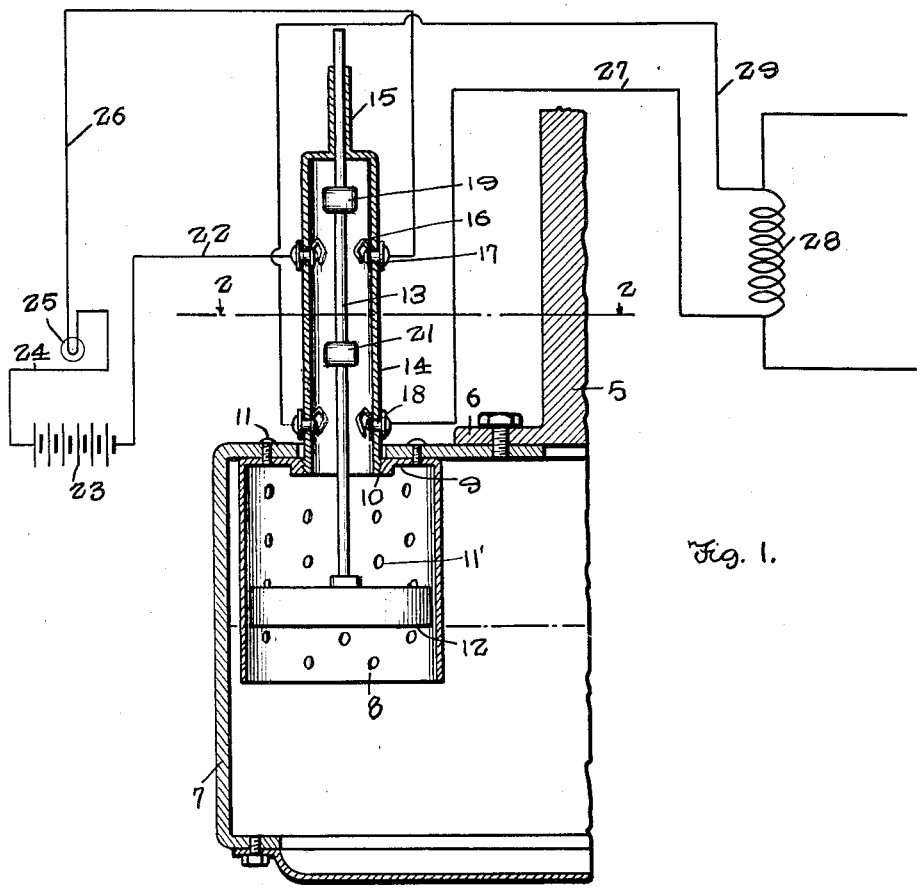
Figure 2:
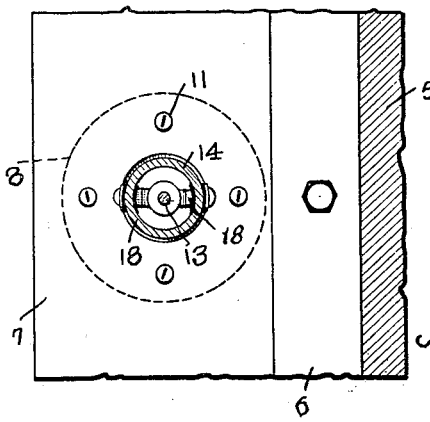

In the accompanying drawing forming a part of this specification and in which like numerals are employed to designate corresponding parts throughout the same:

Figure 1 is a vertical sectional view through the apparatus embodying my invention shown in connection with the crank case of an internal combustion engine, and Figure 2 is a horizontal sectional view taken on the line 2—2 of Figure 1.

In the drawing, wherein for the purpose of illustration is shown the preferred embodiment of my invention, the numeral 5 generally indicates a fragmentary portion of a conventional type of internal combustion engine provided with a horizontal flange 6. This flange is provided at spaced intervals with suitable openings for connection of the usual crank case 7. This structure forms no part of my invention and is merely shown to illustrate the application of my improved apparatus in association therewith.

As is well known to those familiar with this art, the crank case of the engine carries a substantial quantity of lubricating oil by means of which the moving parts of the engine are lubricated. It is customary, at the present time, to mount oil indicating gauges upon the crank case so that the driver or engine operator may ascertain the oil contents in the crank case. These gauges very often become inoperative and mislead the driver as to the amount of oil carried by the engine. It also happens, that the crank case bolts become loosened and an unusual amount of lubricant lost in this manner. If the engine operator is not aware of this condition, it is very likely that the oil will be drained from the crank case and the bearings of the motor burnt out preventing further operation of the vehicle and causing great damage. With this in mind, my invention aims to provide a simple apparatus adapted to warn the operator of the diminishing oil supply and when the oil reaches a dangerous low level, acting automatically to cut off the supply of current to the ignition system so that further operation of the vehicle is prevented.

Referring now more particularly to the structure embodying my invention, the numeral 8 indicates a cylindrical casing which is open at its lower end and is provided in its top 9 with a threaded opening 10. This cylindrical casing 8 is secured to the top of the crank case by screws 11 or in any other suitable manner, the cylinder extending substantially downward into the crank case. As it is necessary that the oil contained in the crank case may freely enter the cylinder 8 the walls of the cylinder are provided with a plurality of openings 11'. A hollow cylindrical float of light metal or similar material is arranged within the cylinder and carries a vertically extending rod 13.

Mounted on the crank case 7 in a central position above the cylindrical casing 8 is a tubular housing 14 seated in the opening 10 in the upper end of the casing and adapted to enclose the rod 13. The lower end of this housing is open, while the upper end is closed with the exception of a central opening and a sleeve 15 is mounted upon the top of the housing and is in communication at its lower end with the opening.

As will be noted from Figure 1 of the drawing, the rod 13 carried by the float extends upwardly through the housing 14, the upper end of the rod being slidably movable and guided in the sleeve 15.

It will be understood that the float 12 will follow the level of the oil in the crank case and thus cause vertical movement of the rod 13.

As it is intended that movement of the float and rod mounted thereon will automatically indicate to the driver the low oil content of the crank case and if this signal is not heeded, will operate to completely prevent further operation of the motor, the housing is provided adjacent its upper end with a pair of oppositely disposed resilient contact members 16 securely retained in position by terminal screws 17 extending through the housing. Similarly arranged contacts 18 are mounted adjacent the lower extremity of the housing 14, bridging of these contacts serving to automatically close an electrical circuit as will be presently explained. The upper contacts 16 are engageable by a collar 19 mounted on the upper end of the rod 13 while the lower contacts are adapted to be engaged by a collar 20. These collars are securely fastened to the piston rod and are arranged so that when the crank case contains a sufficient amount of oil these collars assume elevated positions relative to the respective contacts. The position of the lower collar 21 relative to the lower contacts 18 is of greater elevation than the position of the upper collar relative to the upper contacts so that the uppermost collar will bridge the upper contacts prior to bridging of the lower contacts by the collar 21. The uppermost contacts are located in a signal circuit embodying a conducting wire 22 connected to one of the contact terminals 16 and extending to a battery illustrated diagrammatically at 23. This circuit also includes a wire 24 extending from the battery 23 to a light or other form of signal 25. This circuit is then completed by a connecting wire 26 extending from the signal 25 to the opposite terminal 16. As the float descends with the lowering oil level the collar 19 will contact with the contact members 16 and close this circuit so as to operate the signal 25 and thus warn the driver of the decreasing oil supply. If the operator disregards the signal 25 a further decrease in the oil supply will automatically stop the operation of the motor by means of a circuit in which the contacts 18 are located. This circuit embodies an electrical conducting wire 27 connecting with one of the contact terminals 18 and extending to a coil 28, which may be in the nature of a solenoid, in the ignition circuit. This circuit includes a conductor wire 29 extending from the coil 28 to the other terminal 18.

As previously intimated the apparatus is intended to primarily provide an automatically operated signal adapted to warn the operator of an internal combustion engine of the necessity of replenishing the fuel supply in the crank case. Means is further provided to automatically stop the operation of the engine when the oil supply has decreased so as to endanger the engine structure. This latter operation is performed through an electrical circuit connected with the housing of my improved apparatus and embodies the use of any well known type of electrical circuit breaker so as to break the circuit through the ignition system of the engine and prevent its further operation.

While the apparatus has been shown and described in connection with the oil reservoir of an internal combustion engine, it is not restricted to this particular use and may be advantageously employed as a safety apparatus in connection with radiators and similar containers.

It is to be understood that the form of my invention herewith shown and described is susceptible of modification and that various changes as to the shape, size and arrangement of parts may be resorted to without departing from the spirit of the invention or the scope of the subjoined claim.

Having thus described my invention, I claim:

In liquid level indicating apparatus, a cylindrical casing for installation in a liquid container open at its bottom and provided, throughout the height of its circumferential wall, with perforations, the casing being closed at its top and provided in its closed top with a threaded opening, a housing exteriorly threaded at its lower end and fitted in said opening, the housing being closed at its top and provided with a tubular sleeve extension in axial alinement therewith, spaced pairs of yieldable contacts mounted upon the inner side of the wall of the housing at diametrically opposite points in each pair, a float comprising a cylindrical head fitted and guided within the casing, a stem extending axially upwardly from the float into the housing and slidably fitting within the tubular neck, and fixed bridging elements upon said stem for bridging the said contacts and spaced apart a distance less than the distance between the pairs of contacts.

In testimony whereof I affix my signature.

JOHN C. WALTERS.